S. B. STARK.
CULTIVATOR.
APPLICATION FILED JUNE 21, 1915.

1,181,353.

Patented May 2, 1916.

Witnesses
R. K. Stevens.
H. M. Test.

Inventor
S. B. Stark.
By Chandler & Chandler
Attorney

THE COLUMBIA PLANOGRAPH CO., WASHINGTON, D. C.

UNITED STATES PATENT OFFICE.

SUMMERFIELD B. STARK, OF ALEXANDER CITY, ALABAMA.

CULTIVATOR.

1,181,353.  Specification of Letters Patent.  Patented May 2, 1916.

Application filed June 21, 1915. Serial No. 35,357.

*To all whom it may concern:*

Be it known that I, SUMMERFIELD B. STARK, a citizen of the United States, residing at Alexander City, in the county of Tallapoosa, State of Alabama, have invented certain new and useful Improvements in Cultivators; and I do hereby declare the following to be a full, clear, and exact description of the invention, such as will enable others skilled in the art to which it appertains to make and use the same.

This invention relates to improvements in cultivators.

One object of the invention is to provide a novel and simple attaching means for individual teeth of the cultivator.

Another object is to provide a clamping device detachably carried by the cultivator which is adapted to detachably hold the cultivator teeth so that the same can be quickly and easily removed for repairs or replacing.

Other objects and advantages will be apparent from the following description when taken in connection with the accompanying drawing.

Figure 1:
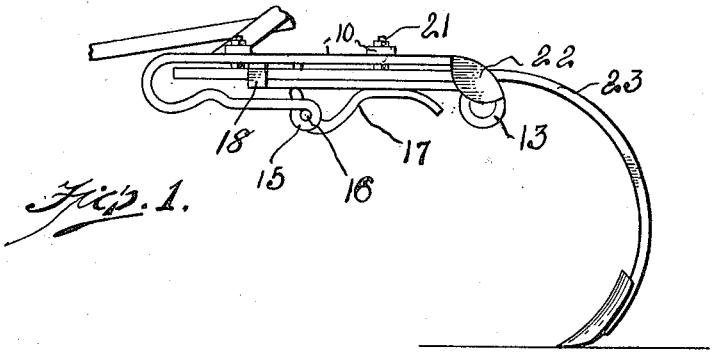
Figure 2:
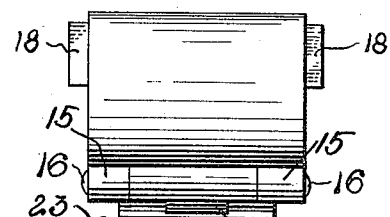
Figure 3:
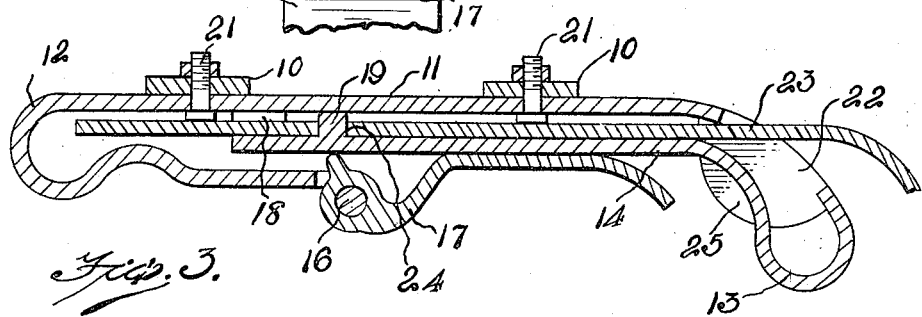
Figure 4:
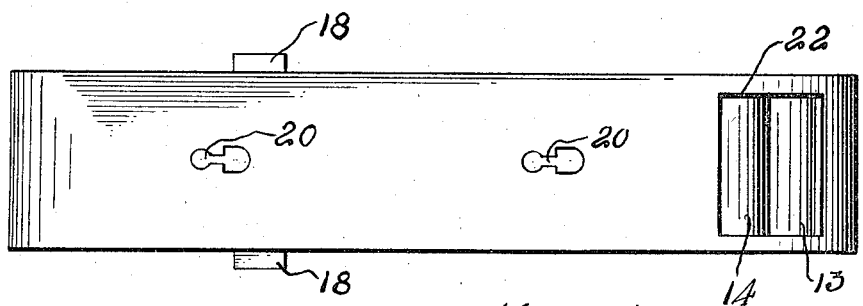

In the drawing: Figure 1 is a side elevation of a portion of the cultivator and the teeth held to the cultivator by my improved clamp, Fig. 2 is a front elevation of the same, Fig. 3 is a vertical section taken longitudinally through the structure shown in Fig. 1, Fig. 4 is a top plan view of the clamp.

Referring particularly to the accompanying drawing, 10 represents a portion of the frame of the cultivator to which my improved clamp is attached. The main or body portion of the clamp is formed of a single strip of metal 11, the ends of which are doubled on themselves as shown respectively at 12 and 13. The doubled end 13 is turned downwardly at an obtuse angle and then upwardly from whence it extends in an approximately parallel relation with the portion 11, as shown at 14. The other end is continued to a point beneath the end of the portion 14, where it terminates in a pair of transversely alined eyes 15 carrying a pivot pin 16 on which is mounted a cam lever 17. The end of the portion 14 has on each side an upturned lug 18 and intermediate the marginal edges of said member and in advance of these lugs is a lug 19, said lug extending vertically from the member 14. Formed through the portion 11, adjacent each end is a keyhole slot 20 which receives one of the pair of bolts 21 extending downwardly through the frame 10 of the cultivator, and by means of which the clamp is firmly held thereto. In the double end 13, there is a transversely elongated opening 22 through which the stem of the spring tooth 23 is inserted, the stem of the tooth having an opening 24 which receives the round lug 19 therethrough. When the stem is so placed between the members 11 and 14, the cam lever is swung on its pivot to force the member 14 toward the member 11, this firmly clamping the stem of the tooth between said members and holding the same against derangement. The lugs 18 hold the stem against lateral movement and also prevent the portion 14 from moving laterally as said lugs are adapted to engage the sides of the member 11. It will of course be understood that there is one of these clamps for each of the teeth of the cultivator. At each end of the opening 22, the edge of the downturned portion 13 is formed with a depending flange 25 serving as additional guards to hold the member 14 against lateral movement.

It will thus be seen that when the lever is thrown down the portion 14 will spring away from the portion 11 and permit the stem of the teeth to be passed through the opening 22 and between the members 11 and 14 so that the lug 19 can be engaged in the opening of the stem. In this same position of the clamp a broken or a bent tooth can be readily extracted for repairs or for replacing. After the tooth is inserted, the lever is thrown upwardly against the member 14 so as to force said member upwardly and firmly press the stem of the tooth in proper position.

What is claimed is:

A clamp for a cultivator tooth comprising a body portion adapted to be secured to the frame of a cultivator, the opposite ends of the body portion being downwardly and inwardly turned beneath the body and in overlapping relation, one of the downturned portions having an opening for the reception of the stem of a cultivator tube, one of the overlapping ends having a lug for engagement in an opening in the stem and a pair of lugs for engaging the sides of the body portion, and a cam lever carried by the other overlapping end engaging with the first end and arranged to force the said end toward the body portion into clamping engagement with the stem of the tooth.

In testimony whereof, I affix my signature, in the presence of two witnesses.

SUMMERFIELD B. STARK.

Witnesses:
P. O. STEVENS,
M. PETERS.